United States Patent
Cerv

[11] Patent Number: 5,918,493
[45] Date of Patent: Jul. 6, 1999

[54] SENSOR SUPPORT

[75] Inventor: Horst Cerv, Ratingen, Germany

[73] Assignee: Mannesmann Aktiengesellschaft, Düsseldorf, Germany

[21] Appl. No.: 08/763,231

[22] Filed: Dec. 10, 1996

[30] Foreign Application Priority Data

Dec. 11, 1995 [DE] Germany .......................... 195 47 438

[51] Int. Cl.$^6$ .................................................. B21B 37/58
[52] U.S. Cl. ........................ 72/13.4; 72/10.1; 72/342.3; 72/201; 33/710
[58] Field of Search .................................... 72/10.1, 10.5, 72/10.7, 12.1, 13.4, 13.5, 14.1, 37, 342.3, 201; 73/1.79, 1.81; 33/700, 710; 364/560, 561, 571.01, 571.03

[56] References Cited

U.S. PATENT DOCUMENTS

| 4,059,794 | 11/1977 | Furness et al. | 72/13.4 |
|---|---|---|---|
| 5,392,123 | 2/1995 | Marcus et al. | 72/14.1 |
| 5,533,371 | 7/1996 | Frischknecht et al. | 72/10.7 |
| 5,671,625 | 9/1997 | Barbe et al. | 72/14.1 |

FOREIGN PATENT DOCUMENTS

| 62-220206 | 9/1987 | Japan | 72/13.4 |
|---|---|---|---|

Primary Examiner—Joseph J. Hail, III
Assistant Examiner—Ed Tolan
Attorney, Agent, or Firm—Cohen, Pontani, Lieberman & Pavane

[57] ABSTRACT

A contour measuring devices for measuring the contour of hot-strip rolls installed in a roll stand during a rolling process includes a plurality of distance sensors that extend along the length of the hot-strip roll in a perpendicular and non-contacting manner and, in this manner. Each distance sensor has a measurement head oriented towards the hot-strip roll. The plurality of distance sensors are positioned separate from and lateral to each other on and along a longitudinal support. The longitudinal support is comprised of a double shell tube that cools the design sensors with an inner tube that conducts a coolant, a shell tube that surrounds the inner tube, and an annular space located therebetween. The inner tube is fixed at its opposite ends in a position relative to the shell tube.

4 Claims, 4 Drawing Sheets

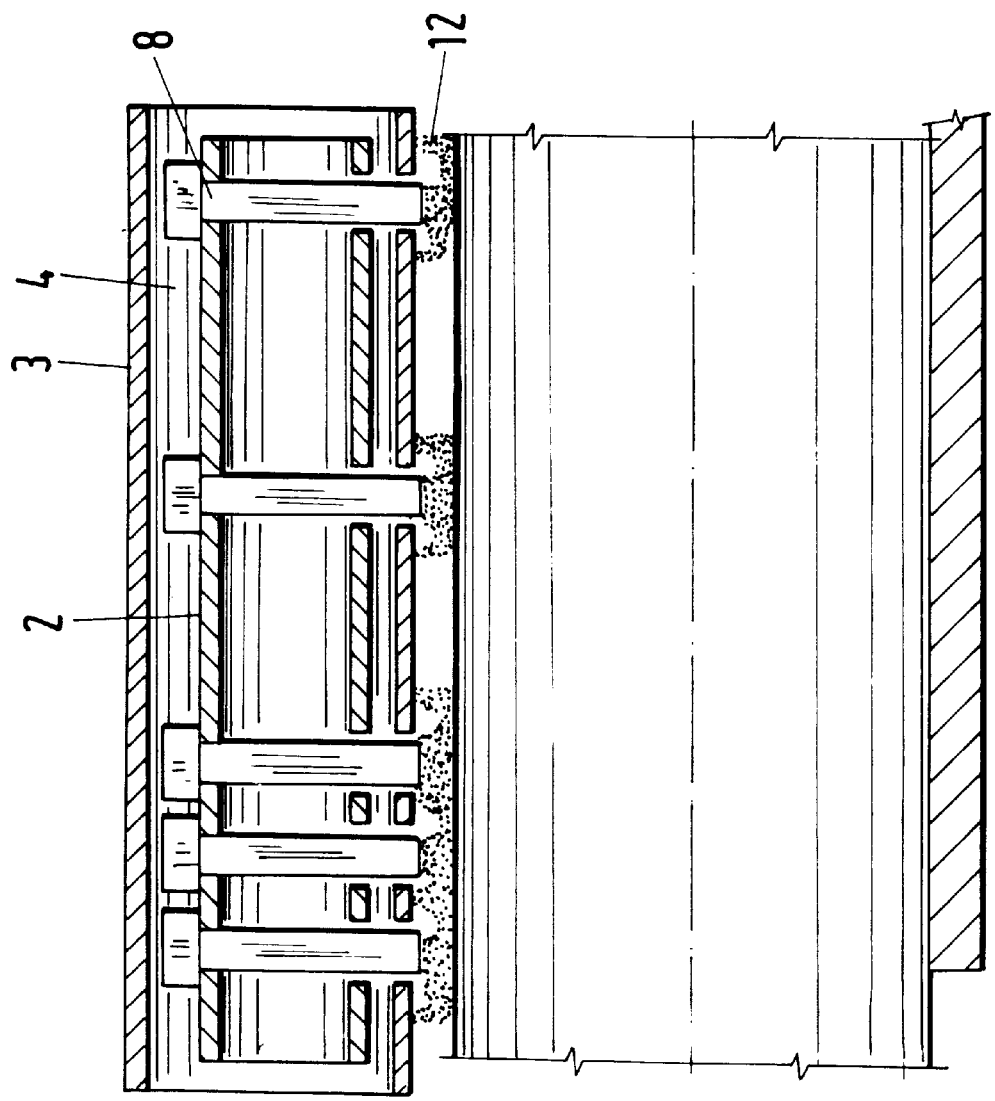
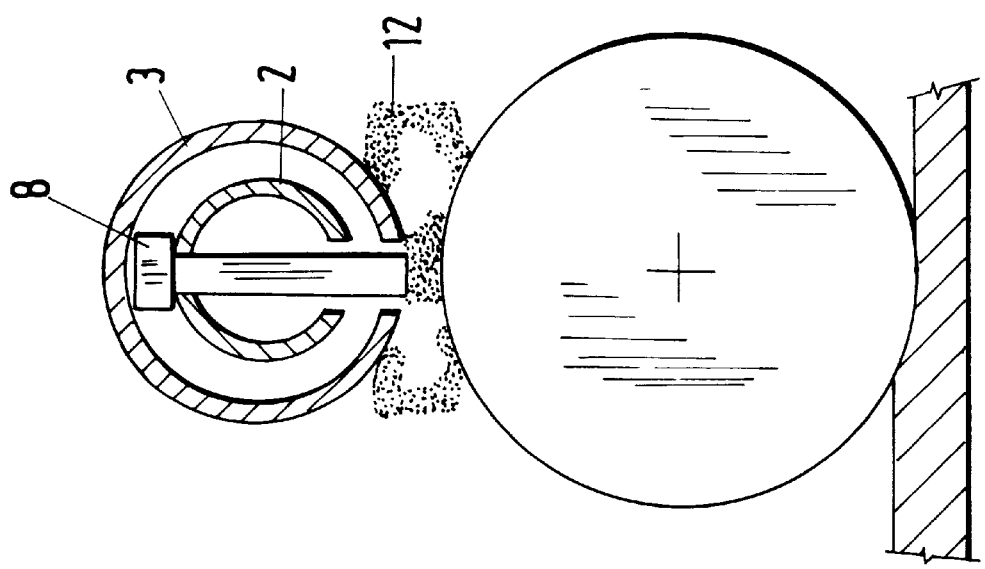

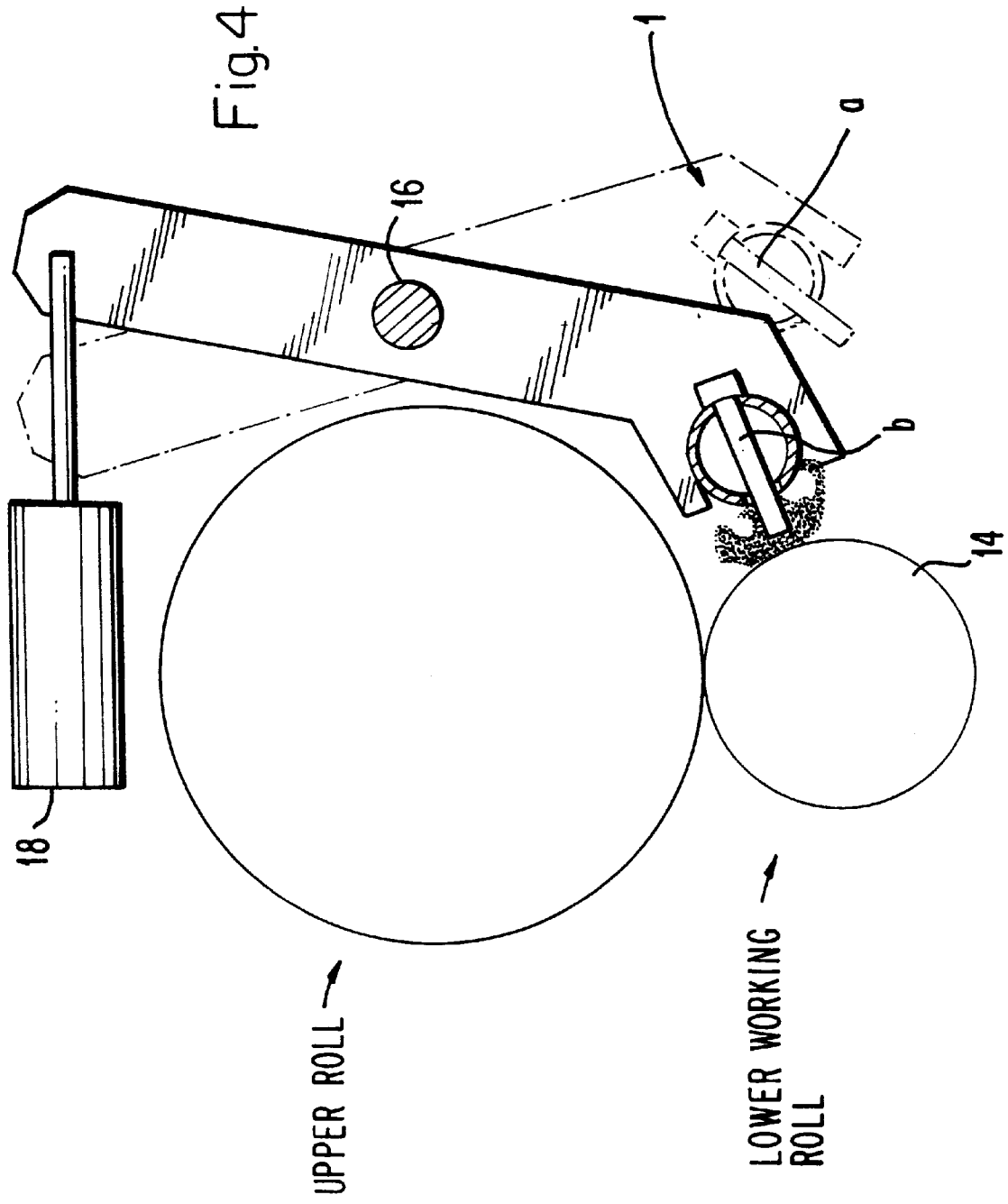

SENSOR SUPPORT

BACKGROUND OF THE INVENTION

1. Field of the Invention

The present invention relates generally to contour measuring devices for measuring the contour of hot-strip rolls installed in a roll stand during a rolling process and, more particularly, to a contour measuring device comprised of a plurality of distance sensors that extend along the length of the hot-strip roll in a perpendicular and non-contacting manner.

2. Description of the Prior Art

A measuring device for measuring the contour of a hot-strip roll is known from JP Abstract 60-180610 A. A four-roll stand for rolling metal strips, which has two working rolls and two support rolls mounted rotatably in chucks, is known from DE-A-2 260 256. During the rolling process, heavy wear occurs on the roll surfaces, especially those of the working rolls. Local depressions, known as wear marks, form in the roll surface, particularly in the area near the edges of the material being rolled. These wear marks intensify when metal strips of the same width are rolled continually. As the rolls become more worn, the flatness of the rolled metal strips declines drastically. In order to prevent or reduce this effect, it is necessary to regrind or change the rolls at cyclical intervals. In general, these intervals are established inflexibly on the basis of operational experience. However, because the wear on the rolls occurs irregularly, the restoration cycles of the rolls or roll surfaces are not implemented in an optimal, i.e., an economical manner.

In order to determine the precise timepoint for regrinding or exchanging the rolls, it is necessary to continuously measure the wear undergone by the rolls. This can be done, for example, by measuring the contour of the roll surface at suitable chronological intervals and with suitable measurement accuracy. It is then possible to accurately determine the wear on the rolls from the difference between the original roll contour and the current roll contour. For the purpose of such measurement, a distance sensor is usually guided longitudinally across the roll surface.

A mechanical distance sensor used in roll grinding machines is known from EP-B1-0239161. However, it is not possible using this distance sensor to directly measure the contour of the hot roll surface in the stand, because of the unfavorable ambient conditions, particularly the high temperatures, in the region of the rolls. Due to thermal expansions, the measurement error is too large. Furthermore, it takes a relatively long time to carry out measurement with such a measuring device. This is a disadvantage, because after even one minute the thermal barrel of the roll begins to reform significantly, while the primary object of measurement is to obtain an accurate picture of the thermal barrel, i.e., the true contour of the hot roll surface, during the rolling process. Highly accurate determination of the roll contour during the rolling process is not possible using a measuring device of this type.

SUMMARY OF THE INVENTION

It is an object of the present invention is to provide a contour measuring device for measuring the roll contour, especially of hot strip rolls installed in a roll stand, which makes it possible to determine the contour of the hot rolls (the thermal barrels) across the entire roll length during a rolling process with high measurement accuracy and in every state of wear.

This object is attained in accordance with the invention by a contour measuring device comprised of a plurality of distance sensors that extend along the length of the hot-strip roll in a substantially perpendicular and non-contacting manner. Each distance sensor has a measurement head oriented towards the hot-strip roll. The plurality of distance sensors are positioned separate from and lateral to each other on and along a longitudinal support. The longitudinal support is comprised of a double shell tube that cools the design sensors with an inner tube that conducts a coolant, a shell tube that surrounds the inner tube, and an annular space located therebetween. The inner tube is fixed at its opposite ends in a position relative to the shell tube.

Preferably, the coolant flows into one end of the inner tube and then flows back through the annular space and out through annular openings formed around the sensors and the outer tube wall. The distance sensors are fixed to the inner tube and penetrate through the outer shell tube through openings in the outer shell wall thereby forming an annular gap around the sensors for cooling the sensors. The longitudinal support may be subjected to a prestress in the direction of its longitudinal axis, and is preferably mounted on a tilting mechanism with which the longitudinal support can be moved from a resting position to a position parallel to the roll's longitudinal axis, (i.e. a measurement position), at which position the measuring can occur. Also the distance sensors are preferably eddy-current sensors, which are positioned parallel to one another, and extend radially relative to the roll surface.

In accordance with the present invention, a plurality of cooled distance sensors that measure in a non-contact fashion are arranged, laterally separated from one another and at a right angle to the longitudinal axis of the roll, on a longitudinal support extending across the length of the roll.

As a result, the roll contour can be determined with high measurement accuracy under the extremely unfavorable ambient conditions in the roll stand during the rolling process. In particular, a contour measuring device of this type makes it possible to keep the measurement error that results from thermal deformations of the measuring device very low. Another advantage of arranging a plurality of laterally-separated distance sensors on a longitudinal support is that the distance sensors do not have to be guided across the entire roll length in order to measure the roll contour. Furthermore, by measuring the roll contour during the rolling process, it is also possible to determine and display the roll bending and to change the same by means of control elements, in order, for example, to deliberately set a roll gap. As a result, the flatness and size accuracy of the strips can be improved.

In order to cool the distance sensors, the longitudinal support is designed as a double-shell tube, which has an inner tube for conducting a coolant and an outer tube (shell tube) that surrounds the inner tube while leaving an annular space. The inner tube is advantageously attached to the ends of the shell tube, so that no heat bridges are formed in the central tube region.

Advantageously, the coolant is also used to cool the shell tube, in that the coolant is introduced into the inner tube at one end and flows back through the annular space.

Strong thermal decoupling is achieved by the fact that the distance sensors are attached only to the inner tube.

As described above, to allow measurements to be carried out, openings are provided in the shell tube. The distance sensors penetrate the wall of the shell tube through these openings, leaving an annular gap through which coolant emerges. The coolant emerging through the annular gap ensures that the distance sensor heads are cooled. Measurements are thus carried out at a defined constant temperature for all distance sensors.

To prevent natural vibrations from distorting the measurement results, such vibrations are advantageously dampened by applying a prestress in the direction of the longitudinal axis of the longitudinal support.

Alternate measurements of the working roll and the supporting roll are preferably carried out by tilting the longitudinal support around an axis parallel to its own longitudinal axis by means of a suitable tilting mechanism.

Especially precise measurements are made possible by commercially available distance sensors designed as eddy-current sensors (e.g. Carl Schenk, Darmstadt, Germany), which are advantageously oriented parallel to one another and radially relative to the roll surface.

In addition, the longitudinal support is advantageously designed in such a way that it can be moved parallel to the axis of the roll out of a parked position and into a measurement position. As a result, the longitudinal support and the distance sensors are exposed to unfavorable ambient conditions only for the duration of the measurement. This increases the useful life of the distance sensors.

The invention can be used in two-roll stands, multi-roll stands and four-roll stands as well as in rolling mills for flat products and profiles.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

An example of the invention is shown in the drawings and described below in greater detail.

In the drawings:

FIG. 3 is a partially cross-sectional view and longitudinally sectional view through the longitudinal support during the operation of the measuring device; and FIG. 4 is a schematic cross-sectional view showing the measuring device of the present invention in different positions.

DETAILED DESCRIPTION OF THE PRESENTLY PREFERRED EMBODIMENTS

Figure 1:
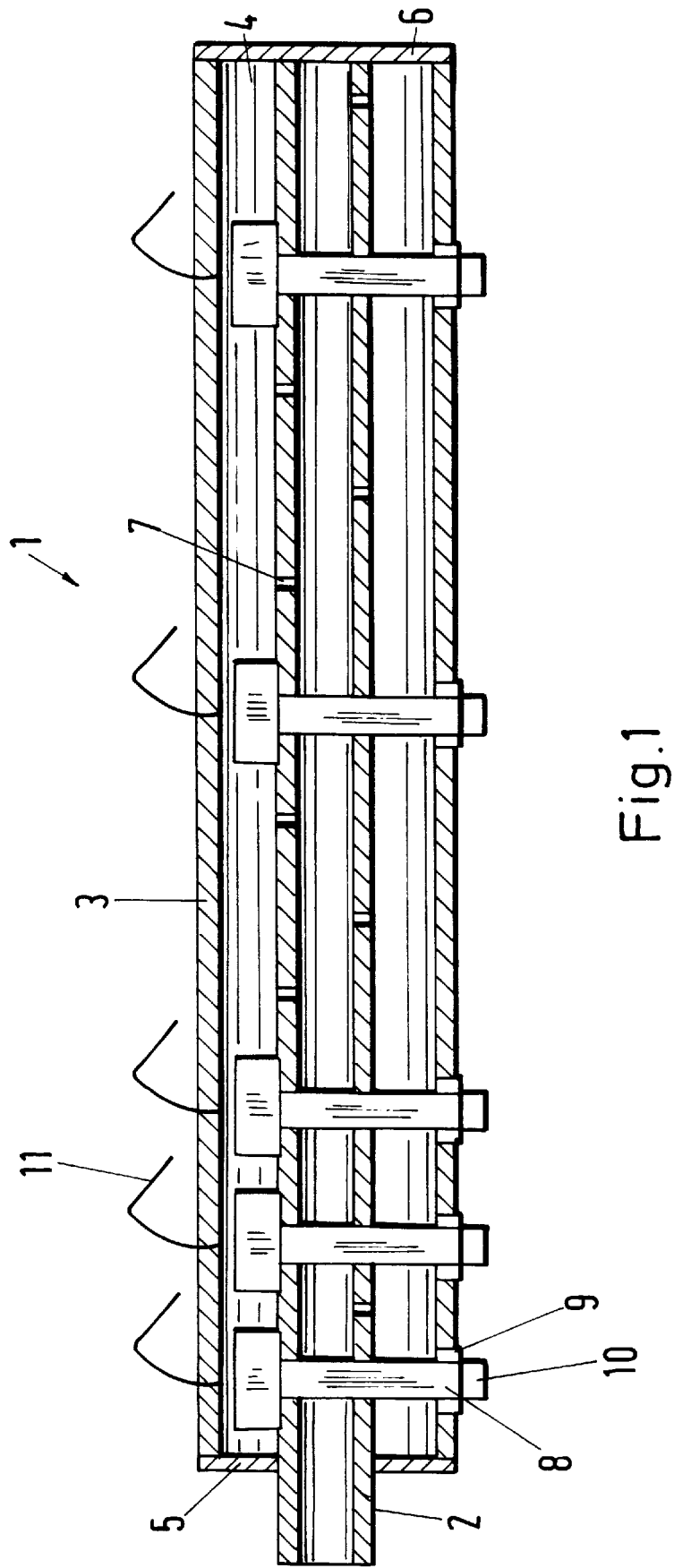
FIG. 1 is a longitudinal sectional view through a longitudinal support designed as a double-shell tube.

FIG. 1 shows a longitudinal section through the longitudinal support 1 of a contour measuring device, which is especially suitable for measuring the profile of hot-strip rolls in a roll stand during the rolling process. As FIG. 1 shows, the longitudinal support 1 is designed as a hollow profile with a double shell, preferably as a double-shell tube; the inner tube 2 and the shell tube 3 are coaxially arranged so as to be fixed in place relative to one another while leaving an annular space 4. The shell tube 3 is closed in the area of the end faces. The inner tube 2 penetrates the side wall 5 of the shell tube 3 on one side and on the opposite side is attached to the to the side wall 6 of the shell tube 3. The shell tube 3 and the inner tube 2 are thus connected to one another at only two points, so that no further heat bridges exist in the central area of the double-shell tube. The inner tube 2 is connected on the side penetrating the shell tube 3 to a coolant supply (not shown); usually, water is used as the coolant. The inner tube 2 has a plurality of openings 7, through which the pressurized coolant flows into the annular space of the double-shell tube 4 during operation. Furthermore, as FIG. 1 shows, a plurality of distance sensors 8, which are arranged parallel to and at a lateral distance from one another and radially penetrate the inner tube 2, are attached to the inner tube 2. The distance of the distance sensors 8 from one another can vary, depending on the desired resolution. When the contour change per length unit of the roll is low, experience has shown that a relatively large distance between the sensors can be chosen. In contrast, in the case of larger profile changes, the selected distance between the distance sensors 8 must be significantly smaller for the contour curve to be correctly determined. The distance sensors 8 are oriented parallel to one another; they radially penetrate the shell tube 3 at openings 9 specifically provided for this purpose, so that the measurement heads 10 of the distance sensors 8 project slightly out of the shell tube. The openings 9 in the shell tube 3 have a larger diameter than the distance sensors 8, permitting coolant to emerge through the annular gap thus formed. The electrical connection lines 11 of the distance sensors 8 run through the shell tube 3 on the side opposite to the shell openings 9 and are connected to suitable control and analysis devices (not shown).

In order to dampen natural vibrations, the support tube 1 can be subjected to prestress parallel to its longitudinal axis. This can be done, for example, by an arrangement of tension rods that are distributed across the length of the shell tube, specifically in order to establish a natural frequency that does not disturb the operation of the contour measuring device., i.e., in order to shift the natural frequency of the longitudinal support into a more favorable range. By suitable selection of materials and dimensions, it is possible to further reduce the probability of undesired natural vibrations of the longitudinal support 1. In particular, the use of hollow bodies that have elliptical cross-sections rather than circular ones, for example, is an elegant variant for suppressing natural frequencies.

The distance sensors 8 are preferably eddy-current sensors, which are especially suited for accurate non-contact distance measurements because of their non-sensitivity.

Figure 2:
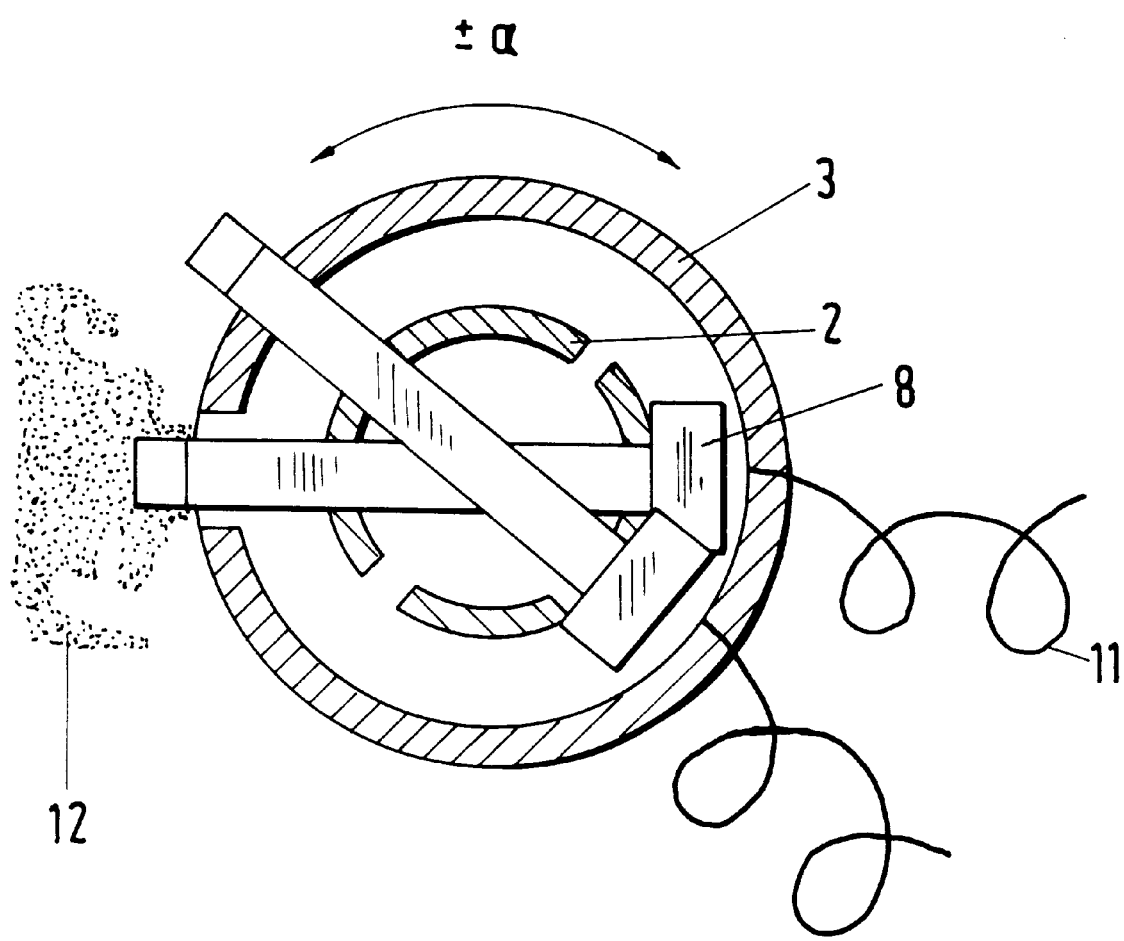
FIG. 2 is a cross-sectional view through the longitudinal section support depicted in FIG. 1.

The longitudinal support 1 can be moved out of a protected parked position into a measurement position parallel to the axis of the roll to be measured by means of a carriage. In addition, the holder of the longitudinal support is embodied in such a way that the longitudinal support can be tilted by means of a tilting mechanism (also not shown). This can be seen more clearly in FIG. 2. As a result, it is possible, given such an arrangement of the longitudinal support, to alternately measure the support roll and the working roll by simply tilting the longitudinal support toward the roll in question. Advantageously, the parallel distance sensors 8 are oriented radially relative to the roll surface to be measured in both measurement positions. FIG. 3 schematically shows a cross-section and a longitudinal section through a longitudinal support in the measurement position during measurement.

The contour measuring device functions as follows: As shown in FIG. 4 at the beginning of the rolling process, the longitudinal support 1 with the distance sensors 8 is moved with drive means 18 out of the parked position a and into the measurement position b parallel to the axis of the roll 14. The distance sensors 8 are oriented radially relative to the appropriate roll surface by being tilted around the axis 16 of the longitudinal support. The sensor heads of the distance sensors 8 are thereby located at a preset distance from the roll surface. As shown in FIG. 1 for the purpose of cooling, a suitable coolant (water) is fed into the inner tube 2. The coolant flows around the distance sensors 8, cooling them, and through the openings 7 in the inner tube into the annular space of the double-shell tube, so that the shell tube 3 is also cooled. The coolant leaves the longitudinal support 1 through the annular openings 9, cooling, in particular, the distance sensor heads 10. Between the roll surface and the distance sensor head 10, the emerging cooling liquid forms a liquid-steam atmosphere 12 (indicated schematically in FIG. 2), which simultaneously serves as a heat protection shield in the region of the distance sensor head 10. The distance sensors, which are attached only to the inner tube, are cooled by the coolant in such a way that all distance sensors have the same temperature (or the same temperature curve across the sensor length). Thanks to the coolant emerging at the annular gap, especially intensive cooling of the distance sensor heads 10 is achieved. Eddy-current sensors are especially well-suited for this type of cooling, because the dielectric coolant causes no additional measurement error. Furthermore, eddy-current sensors make it possible to determine, along with the roll contour, changes in the microstructure of the surface region of the roll.

Furthermore, on the basis of the roll contour determined during the rolling process, it is also possible to determine and display the roll bending and to change it deliberately by means of control elements, for example, in order to set or correct the roll gap. In turn, this makes it possible to significantly increase the flatness and size accuracy of the strips.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A contour measuring device for measuring the contour of hot-strip roll having an axis and a length during a rolling process, said device comprising:

an elongated support extending along a length of the roll, said support comprising an outer tubular member (3) having a plurality of openings (9) therein and an inner tubular member (2) having ends affixed to said outer tubular member and being coaxially disposed within said outer tubular member so as to form an annular space (4) therebetween;

a plurality of distance sensors operable for measuring the contour of the roll in a non-contacting manner, said sensors being mounted on said inner tubular member (2) in spaced relation to each other and extending substantially transverse to the axis of the roll through said openings in said outer tubular member (3);

said inner tubular member (2) having an inlet opening and a plurality of apertures for permitting cooling fluid to pass from said inner tubular member (2) into said annular space (4) and past said distance sensors (8) out through said openings (9) in said outer tubular member (4) for cooling said distance sensors (8).

2. The contour measuring device according to claim 1, additionally comprising means for moving said elongated support from a first resting position into a second measuring position substantially parallel to the axis of the roll.

3. The contour measuring device according to claim 1, wherein the distance sensors are eddy-current sensors.

4. The contour measuring device according to claim 1, wherein the distance sensors extend parallel to each other and transverse towards the axis of the roll.

* * * * *